United States Patent
Samson et al.

(10) Patent No.: US 7,813,641 B1
(45) Date of Patent: Oct. 12, 2010

(54) FIBER OPTIC CABLE TOPOLOGY FOR FIBER OPTIC REPEATER DISTRIBUTED ANTENNA SYSTEM

(75) Inventors: Louis John Samson, Clawson, MI (US);
Sunil Dwarka Prasad, Novi, MI (US);
Thomas Lawrence Bugg, Jr., Macomb, MI (US)

(73) Assignee: Nextel Communications Company L.P., Reston, VA (US)

( * ) Notice: Subject to any disclaimer, the term of this patent is extended or adjusted under 35 U.S.C. 154(b) by 811 days.

(21) Appl. No.: 11/652,746

(22) Filed: Jan. 12, 2007

(51) Int. Cl.
*H04B 10/20* (2006.01)
*H04W 4/00* (2009.01)
*H04M 1/00* (2006.01)

(52) U.S. Cl. .................. 398/59; 370/328; 455/562.1; 398/115

(58) Field of Classification Search ............... 398/3, 398/59, 115; 370/328; 455/562.1
See application file for complete search history.

(56) References Cited

U.S. PATENT DOCUMENTS 7,627,245 B2 * 12/2009 Jenkins et al. ............... 398/57

| | | | |
|---|---|---|---|
| 2003/0099446 A1 * | 5/2003 | Witt et al. | 385/109 |
| 2005/0259608 A1 * | 11/2005 | Ortega | 370/328 |
| 2006/0078332 A1 * | 4/2006 | Fang et al. | 398/19 |
| 2007/0280696 A1 * | 12/2007 | Beaver | 398/140 |

* cited by examiner

Primary Examiner—Nathan M Curs

(57) ABSTRACT

A fiber optic cable topology for a fiber optic repeater distributed antenna system network and a method of configuring the network using the topology is disclosed. The topology includes a first base transceiver station hub, a second base transceiver station hub, and a fiber optic backbone coupled between the first base transceiver station hub and the second base transceiver station hub, where the fiber optic backbone includes a plurality of optical fibers. A distributed antenna system repeater node is coupled to the first base transceiver station hub and the second base transceiver station hub. An optical fiber of the plurality of optical fibers in the fiber optic backbone includes a first portion and a second portion, where the first portion extends between the first base transceiver station hub and the DAS repeater node and the second portion extends between the second base transceiver station hub and the DAS repeater node.

13 Claims, 2 Drawing Sheets

FIBER OPTIC CABLE TOPOLOGY FOR FIBER OPTIC REPEATER DISTRIBUTED ANTENNA SYSTEM

FIELD OF THE INVENTION

The present invention relates generally to the field of telecommunications, and in particular, to a fiber optic cable network topology.

BACKGROUND OF THE INVENTION

Fiber optic technology is increasingly being utilized in cellular communications networks for a variety of purposes. Optical fiber generally has increased transmission capacity over copper wire and is generally more resistant to the effects of electromagnetic interference. Whereas this technology is being incorporated into cellular networks, the present state of incorporation does not efficiently utilize the fiber optic cable in the cable topologies of the fiber optic networks. This is particularly so in a fiber optic repeater distributed antenna system network.

FIG. 1 illustrates two base transceiver station (BTS) hubs 110 and 112 of a fiber optic repeater distributed antenna system network 100 which are interconnected by a network backbone 114. Other components of the network are not illustrated since they, and their functionality in the network, are well-known in the art, e.g., mobile switching office (MSO) and the Public Switched Telephone Network (PSTN).

The backbone generally includes optical fibers that may be bundled in a plurality of buffer tubes. These optical fibers are used not only to interconnect the BTS hubs of the network, but additionally, to connect a repeater node 116 to a hub of the network. Repeater node 116 may be an optical repeater that is used in the distributed antenna system (DAS) network. As is known, the DAS node extends the coverage area of a cell. Generally, the remote repeater node 116 is connected to one of the BTS hubs by a fiber(s) that is broken out from the network backbone 114. As can be seen, optical fiber 114A is broken out from the backbone and is utilized to connect node 116 to BTS 110. Whereas only one DAS node 116 is illustrated as being attached to BTS 110, as can be understood, there may be many DAS nodes coupled to BTS 110 and there may be many other DAS nodes coupled to the other BTSs in the network 100. This cable topology shown in FIG. 1, where an optical fiber is broken out from the backbone to couple a DAS node to a BTS presents drawbacks. These drawbacks are particularly compounded when many DAS nodes are coupled to the many BTSs that may be incorporated into the fiber optic repeater distributed antenna system network.

A problem with the topology illustrated in FIG. 1 is that when the optical fiber is broken out from the backbone to couple the node to a BTS hub, the continuously running fiber in the backbone is cut and run from the one BTS hub to the node. Thus, the cut fiber is terminated at the node. This optical fiber run 114A can be seen in FIG. 1. Thus, the optical fiber run 114A from BTS hub 110 to node 116 is an efficient use of this portion of the fiber from the backbone. However, that portion of the fiber in the backbone that is on the other side of the coupled node, i.e., extending in the backbone between node 116 and BTS hub 112, is wasted since the fiber is broken out from the backbone and terminated at node 116 from BTS 110. Thus, this remaining portion of the optical fiber in the backbone is wasted, at least for this physical location of the backbone fiber. This is an inefficient use of the optical fiber in the backbone, and as can be understood, when many DAS nodes are connected to many BTSs in the network in this manner, this inefficiency is multiplied many times over.

An additional drawback with the topology of FIG. 1 is the lack of the ability of the network to recover from an interruption of service between BTS 110 and DAS node 116. As can be seen, the only connection of DAS node 116 to network 100 is through BTS hub 110 and the optical fiber run 114A. As discussed above, the optical fiber that couples BTS hub 110 to DAS node 116 is terminated at the DAS node and the fiber on the other side of the coupled node remains unterminated in the backbone. Thus, as can be understood, if for any reason BTS hub 110 becomes inoperative or the fiber run 114A becomes unable to transmit an optical signal between the BTS hub and the node, network service associated with DAS node 116 will be lost. Therefore, the fiber optic cable topology of FIG. 1 does not provide sufficient redundancy for the fiber optic repeater distributed antenna system network.

Therefore, there is a need for a fiber optic cable topology for a fiber optic repeater distributed antenna system network that provides for greater efficiency for the use of the optical fibers in the cable topology and redundancy in the network.

SUMMARY OF THE INVENTION

A fiber optic cable topology for a fiber optic repeater distributed antenna system network is provided. The topology includes a first base transceiver station hub, a second base transceiver station hub, and a fiber optic backbone coupled between the first base transceiver station hub and the second base transceiver station hub, where the fiber optic backbone includes a plurality of optical fibers. A distributed antenna system repeater node is coupled to the first base transceiver station hub and the second base transceiver station hub. An optical fiber of the plurality of optical fibers in the fiber optic backbone includes a first portion and a second portion, where the first portion extends between the first base transceiver station hub and the DAS repeater node and the second portion extends between the second base transceiver station hub and the DAS repeater node.

In a method of the present invention, a method of configuring a fiber optic repeater distributed antenna system (DAS) network is provided. The method includes detecting an inability for the first base transceiver station hub to transmit a communication to the DAS repeater node and routing the communication to the second base transceiver station hub. The communication is then transmitted from the second base transceiver station hub to the DAS repeater node.

DETAILED DESCRIPTION OF THE EXEMPLARY EMBODIMENTS

Figure 2:
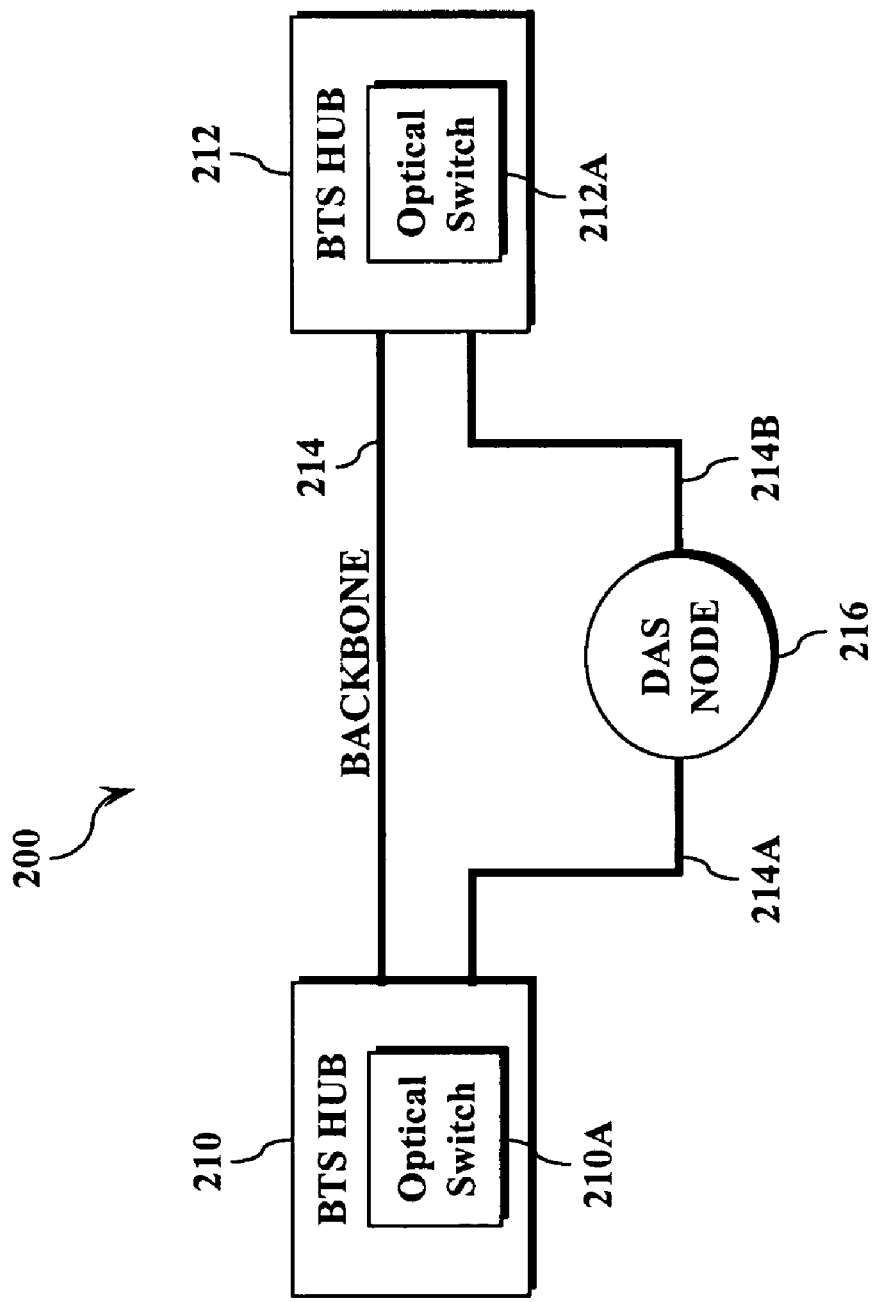
FIG. 2 illustrates a fiber optic cable topology for a fiber optic repeater distributed antenna system network in accordance with the principles of the present invention.

FIG. 2 illustrates two base transceiver station (BTS) hubs 210 and 212 of a fiber optic repeater distributed antenna system network 200 which are interconnected by a network backbone 214. As discussed above, the backbone generally includes optical fibers that may be bundled in a plurality of buffer tubes. In accordance with the principles of the present invention and as will be explained in further detail below, these optical fibers are used to interconnect both of the BTS hubs 210 and 212 to a DAS repeater node 216 of the network.

In accordance with the principles of the present invention, the optical fiber that is broken out from backbone 214 is terminated on both sides of the DAS node 216. Thus, a first portion 214A of the optical fiber is coupled between the first base transceiver station hub 210 and the DAS node 216 and a second portion 214B of the optical fiber is coupled between the second base transceiver station hub 212 and the DAS repeater node 216. Therefore, in contrast with the fiber optic cable topology of FIG. 1 where the continuously running fiber in the backbone is cut and run only from the one BTS hub to the node, and thus, that portion of the fiber in the backbone that is on the other side of the coupled node is wasted, the present invention couples the broken out optical fiber on both sides of the same DAS node 216. Thus, the broken out optical fiber is more efficiently utilized since both portions of the fiber are coupled to the DAS node 216 instead of only terminating the fiber on one side of the node. This is a much more efficient use of the optical fiber in the backbone, and as can be understood, when many DAS nodes are connected to many BTSs in the network in this manner, this efficiency provides benefits multiplied several times over. Again, whereas only one DAS node 216 is illustrated as being attached to BTSs 210 and 212, as can be understood, there may be many DAS nodes coupled to these BTSs and there may be many other DAS nodes coupled to the other BTSs in the network 200.

Figure 1:
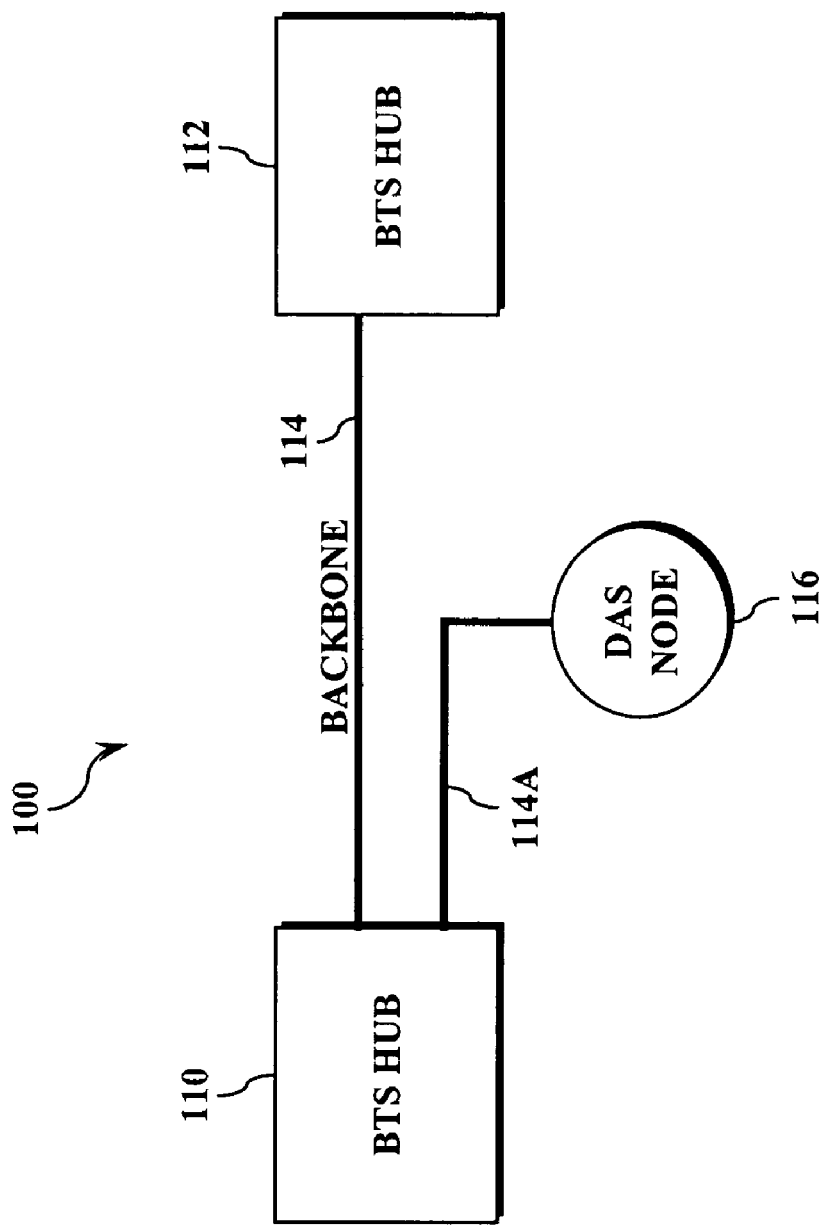
FIG. 1 illustrates a fiber optic cable topology for a fiber optic repeater distributed antenna system network.

Thus, in accordance with the principles of the present invention, an optical fiber is broken out from the backbone by completely splitting the entire buffer tube that contains the fiber at the intersection of the node. Strands, if multiple fibers are used to connect the node to the network, from both sides of the split are terminated at two points on either side of the same node. Reconfiguring of the cable topology in this manner provides at least two advantages: 1) greater efficiency—the fiber that was wasted in the topology of FIG. 1 is no longer wasted, thus providing cost savings through greater efficiency; and 2) as will be discussed further below, redundancy in the network is provided—with the topology of the present invention, each hub provides redundancy to its neighbouring hubs, so a cut in the fiber on either side of the node does not automatically result in a prolonged outage and/or a time consuming, costly repair.

The present invention has particular utility when DAS nodes are added to the fiber optic repeater distributed antenna system network, i.e., either on lateral build-outs or directly on the backbone. Thus, as can be understood, the topology of FIG. 2 can be used for a lateral build-out. For example, assume that BTS 210 of the network is coupled to BTS 212, which is associated with an elementary school. The backbone 214 couples the two BTSs in the network. DAS node 216 is to be added to the network for a lateral build-out of the network. In accordance with the principles of the present invention, assume that, for example, strands 13-16 of a multi-strand fiber optic cable are broken out from the backbone and, thus, are included on both sides of the split. Thus, portion 214A includes strands 13-16 and portion 214B includes strands 13-16. Furthermore, the DAS node 216 may also include lateral build-out fibers on both sides of the node that are used to couple the DAS node into the network. Thus, for example, strands 1-4 from node 216 are used to couple with strands 13-16 of first portion 214A to couple node 216 to BTS 210 and strands 5-8 from node 216 are used to couple with strands 13-16 of second portion 214B to couple node 216 to BTS 212. In this manner, the broken out optical fiber from the backbone is coupled on both sides of the node when laterally building-out the network. Of course, additional fiber strands for spare/dark usage or additional connections to the node may also be included with node 216.

As discussed above, in the present invention, because the DAS repeater node 216 is coupled to both BTS 210 and 212, redundancy is provided in network 200. For example, a self-healing ring network may be included in network 200 and carried over backbone 214 between BTS 210 and 212. With this self-healing ring, if first portion 214A of the break-out fiber is damaged in any way such that BTS 210 cannot transmit signals to DAS node 216, and vice versa, these signals can then be transmitted over the ring network such that they are provided to BTS 212, and ultimately to DAS node 216 from BTS 212 over second fiber portion 214B. Thus, the fiber optic topology of the present invention provides an alternate path on the network to a DAS repeater node.

Even if the network does not include a self-healing ring, the network can also provide for redundancy with the present invention by using other techniques. For example, as shown in FIG. 2, each BTS may include an automated optical switch. The optical switches may be either directly or indirectly coupled to the fiber portions that interconnect the respective base transceiver stations to the DAS node. With the automated optical switches, if there is a problem with BTS hub 210, for example, optical switch 210A of BTS hub 210 detects the problem and is able to automatically backfeed the signal that is directed to DAS node 216 over the fiber backbone and to BTS hub 212 where it can then be transmitted to DAS node 216 over second fiber portion 214B. Similarly, if there is a problem with BTS hub 212, optical switch 212A of BTS hub 212 detects the problem and automatically backfeeds the signal over the fiber backbone to BTS hub 210 where it can then be transmitted to DAS node 216 over first fiber portion 214A.

Likewise, if manual optical switches are included in the BTS hubs, after a problem with transmitting a signal to DAS node 216 is detected, the appropriate switch(es) may be manually operated such that the redundant paths described above can provide for transmitting the signal to the DAS node over an alternate path.

In this manner, not only does the fiber optic cable topology of the present invention provide for a more efficient use of optical fiber in the topology, but it also provides for redundancy in the fiber optic repeater distributed antenna system network.

The disclosed embodiments are illustrative of the various ways in which the present invention may be practiced. Other embodiments can be implemented by those skilled in the art without departing from the spirit and scope of the present invention.

What is claimed is:

1. A fiber optic cable topology for a fiber optic repeater distributed antenna system network, comprising:
   a first base transceiver station hub;
   a second base transceiver station hub;
   a fiber optic backbone coupled between the first base transceiver station hub and the second base transceiver station hub, wherein the fiber optic backbone includes a plurality of optical fibers; and
   a distributed antenna system (DAS) repeater node coupled to the first base transceiver station hub and the second base transceiver station hub;
   wherein an optical fiber is broken out from the fiber optic backbone and includes a first portion and a second portion, wherein the first portion is coupled between the first base transceiver station hub and the DAS repeater node, and wherein the second portion is coupled between the second base transceiver station hub and the DAS repeater node;

wherein the DAS repeater node transmits signals generated by the first base transceiver station hub to provide first base transceiver station hub coverage to at least a section of an area serviced by the first base transceiver station hub; and wherein optical fibers of the plurality of optical fibers of the fiber optic backbone not broken out from the fiber optic backbone are coupled between the first base transceiver station hub and the second base transceiver station hub.

2. The fiber optic cable topology of claim 1, wherein a ring network couples the first base transceiver station hub to the second base transceiver station hub via the fiber optic backbone.

3. The fiber optic cable topology of claim 1, wherein a first communication is provided from the first base transceiver station hub to the DAS repeater node and a second communication is provided from the second base transceiver station hub to the DAS repeater node.

4. The fiber optic cable topology of claim 1, wherein if the first portion of the optical fiber becomes inoperable for transmitting a communication from the first base transceiver station hub to the DAS repeater node the communication is transmitted from the second base transceiver station hub to the DAS repeater node.

5. The fiber optic cable topology of claim 1:
wherein if the first base transceiver station hub is inoperable for transmitting a communication from the first base transceiver station hub to the DAS repeater node
the communication is transmitted from the second base transceiver station hub to the DAS repeater node.

6. The fiber optic cable topology of claim 1, wherein both of the first and second base transceiver station hubs include an automated optical switch.

7. The fiber optic cable topology of claim 6, wherein if the first portion of the optical fiber becomes inoperable for transmitting a communication from the first base transceiver station hub to the DAS repeater node the automated optical switch of the first base transceiver station hub detects an inability for the first base transceiver station hub to transmit a communication to the DAS repeater node and wherein the automated optical switch of the first base transceiver station hub reroutes the communication to the second base transceiver station hub for transmission to the DAS repeater node.

8. The fiber optic cable topology of claim 1, wherein both of the first and second base transceiver station hubs include a manually operated optical switch.

9. The fiber optic cable topology of claim 8, wherein if an inability for the first base transceiver station hub to transmit a communication to the DAS repeater node is detected the manually operated optical switch of the first base transceiver station hub reroutes the communication to the second base transceiver station hub for transmission to the DAS repeater node.

10. A method for coupling a distributed antenna system (DAS) repeater node to a fiber optic repeater distributed antenna system network, comprising the steps of:
breaking out an optical fiber from fiber optic backbone coupled between a first base transceiver station hub and a second base transceiver station hub of the fiber optic repeater distributed antenna system network;
coupling a first portion of the broken out optical fiber from the first base transceiver station hub to the DAS repeater node; and
coupling a second portion of the broken out optical fiber from the second base transceiver station hub to the DAS repeater node;
wherein the DAS repeater node transmits signals generated by the first base transceiver station hub to provide first base transceiver station hub coverage to at least a section of an area serviced by the first base transceiver station hub; and
wherein optical fibers of the plurality of optical fibers included in the fiber optic backbone not broken out from the fiber optic backbone are coupled between the first base transceiver station hub and the second base transceiver station hub.

11. The method of claim 10, wherein the step of breaking out the optical fiber from the fiber optic backbone includes the step of splitting a buffer tube that contains the optical fiber.

12. The method of claim 10:
wherein the step of coupling the first portion of the broken out optical fiber from the first base transceiver station hub to the DAS repeater node includes the step of coupling the first portion to a first optical fiber associated with the DAS repeater node; and
wherein the step of coupling the second portion of the broken out optical fiber from the second base transceiver station hub to the DAS repeater node includes the step of coupling the second portion to a second optical fiber associated with the DAS repeater node.

13. The method of claim 10:
wherein the step of coupling the first portion of the broken out optical fiber from the first base transceiver station hub to the DAS repeater node includes the step of coupling the first portion to a first optical switch associated with the first base transceiver station hub; and
wherein the step of coupling the second portion of the broken out optical fiber from the second base transceiver station hub to the DAS repeater node includes the step of coupling the second portion to a second optical switch associated with the second base transceiver station hub.

* * * * *